United States Patent [19]
Shirk et al.

[11] Patent Number: 5,333,307
[45] Date of Patent: Jul. 26, 1994

[54] CIRCUITRY AND METHOD FOR CAUSING A MICROCONTROLLER/MICROPROCESSOR TO BE ON-CIRCUIT EMULATED

[75] Inventors: Gary G. Shirk, Beaverton; Shailesh M. Vachhani, Portland; Harry L. Hampton, III, Aloha, all of Oreg.

[73] Assignee: Intel Corporation, Santa Clara, Calif.

[21] Appl. No.: 931,158

[22] Filed: Aug. 17, 1992

[51] Int. Cl.$^5$ .................................................. G06F 11/00
[52] U.S. Cl. .................................. 395/575; 364/232.3; 371/16.2
[58] Field of Search .................... 371/15.1, 16.1, 16.2; 395/575

[56] References Cited

U.S. PATENT DOCUMENTS

| | | | |
|---|---|---|---|
| 4,691,316 | 9/1987 | Phillips | 371/16.1 |
| 5,025,364 | 6/1991 | Zellmer | 364/200 |
| 5,056,013 | 10/1991 | Yamamoto | 371/16.2 |
| 5,132,971 | 7/1992 | Oguma et al. | 371/16.2 |

FOREIGN PATENT DOCUMENTS

| | | |
|---|---|---|
| 120547 | 6/1987 | Japan . |
| WO9206428 | 4/1992 | World Int. Prop. O. . |

Primary Examiner—Robert W. Beausoliel, Jr.
Assistant Examiner—Albert Decady
Attorney, Agent, or Firm—Blakely, Sokoloff, Taylor & Zafman

[57] ABSTRACT

An emulation system for performing an on-circuit emulation operation of a component in a data processing system is described. The component includes a plurality of pins coupled to the remaining circuitry of the data processing system. An emulator is coupled to the remaining circuitry in the same manner as that the component is coupled to the remaining circuitry for issuing an on-circuit emulation control signal to one of the plurality of pins of the component to place the component in an on-circuit emulation mode and for performing the on-circuit emulation operation of the component. A reset circuit is coupled to a reset input of the component and a reset input of the emulator for generating a reset signal to reset the component and the emulator. When the reset signal is in a first voltage state, the component and the emulator are in a reset state. When the reset signal reaches a second voltage state, the component and the emulator exit the reset state. A comparator is coupled to receive the reset signal and a reference voltage for causing the emulator to generate the on-circuit emulation control signal to the one of the plurality of pins of the component when the reset signal is in the first voltage state, and for causing the emulator to maintain the on-circuit emulation control signal applied at the one of the plurality of pins of the component until after both the component and the emulator are out of the reset state such that the component can enter the on-circuit emulation mode and the emulator can start the on-circuit emulation operation after both of the component and the emulator exit the reset state. The voltage level of the reference voltage is higher than the second voltage state of the reset signal. A method of placing the component in the on-circuit emulation mode is also described.

22 Claims, 4 Drawing Sheets

CIRCUITRY AND METHOD FOR CAUSING A MICROCONTROLLER/MICROPROCESSOR TO BE ON-CIRCUIT EMULATED

FIELD OF THE INVENTION

The present invention pertains to the field of microprocessors and microcontrollers. More particularly, this invention relates to circuitry and a method for causing a microprocessor and/or microcontroller component on a printed circuit board ("PCB") to be on-circuit emulated, wherein the component is electrically disconnected from external circuitry without being removed from the PCB physically.

BACKGROUND OF THE INVENTION

In the field of microprocessors and microcontrollers, many types of software and hardware development tools have been developed to deliver full access to the power of the architectures of the microprocessors and microcontrollers. The prior microprocessor and microcontroller development tools typically include prior in-circuit emulators, each being dedicated for a family of microprocessors or microcontrollers.

A prior in-circuit emulator typically gives users symbolic access to the internal states of the microprocessor or microcontroller component being emulated. A prior in-circuit emulator precisely matches the electrical and timing characteristics of the microprocessor or microcontroller component being emulated.

In order to perform an in-circuit emulation operation on a prior microprocessor or microcontroller component, the component is removed from the system and a prior dedicated in-circuit emulator for that particular component is connected in the system in the same manner as the component had been before disconnected with the system. This is typically done by having a socket connecting the component to a PCB of the system. During the in-circuit emulation, the component is removed from the socket and an adapter of the prior emulator is directly plugged into the socket, thus connecting the emulator to the circuitry of the system. The socket can be surface mounted to the PCB. The adapter is typically designed to include the same number of pins as that of the component. In addition, the pin formation of the adapter is the same as that of the component.

Disadvantages are, however, associated with this arrangement. One disadvantage associated is that different types of microprocessor or microcontroller components require different types of sockets. This is due to the fact that different types of components have different pin numbers, functions, and formations. As the number of the types of components increases, the number of the types of sockets increases accordingly.

Additionally, the sockets add cost to the printed circuit board and require additional space on the printed circuit board. Also, as the size of the components and therefore pin spacing shrinks, the cost of reliable sockets increases dramatically.

One prior approach to solving these problems is to eliminate the use of the sockets. This is done by mounting a prior microprocessor or microcontroller component directly to the printed circuit board. During the emulation operation, the component is not physically removed from the PCB, but rather electrically disconnected (i.e., tri-stated) with the circuitry of the system. The prior emulator is connected in parallel with the component to be emulated (i.e., in piggyback style). In this case, the emulation is performed without physically removing the component from the system. This approach is referred to as on-circuit emulation.

In order to electrically disconnect the component to be emulated with the circuitry of the system, the prior component is equipped with an on-circuit emulation ("ONCE") mode in which all circuitry of the component is electrically disconnected with the external circuitry. A dedicated ONCE mode pin can be provided on the component to receive an ONCE mode control signal in order to allow the device to enter the ONCE mode.

One disadvantage of this arrangement is that the dedicated pin to the component typically and undesirably increases the package size and the total number of the pins of the component. One prior approach to solving this problem is to trigger the ONCE mode of the component through other existing pin or pins of the component. In this situation, the dedicated ONCE mode pin can be deleted.

FIG. 1 illustrates the prior art arrangement to place a microcontroller 10 into the ONCE mode with a multi-function pin TXD. The TXD pin is an output pin of microcontroller 10 during the normal operation. In FIG. 1, microcontroller 10 and emulator 20 are connected in parallel to system circuitry 11. Emulator 20 therefore has its TXD pin piggyback connected with the TXD pin of microcontroller 10. A reset circuitry 21 provides an active low reset signal $\overline{RESET}$ to a $\overline{RESET}$ pin of microcontroller 10 and a $\overline{RESET}$ pin of emulator 20 via line 30. Therefore, microprocessor 10 and emulator 20 can be reset by the $\overline{RESET}$ signal simultaneously. The $\overline{RESET}$ signal is also applied to a $\overline{FORCEONCE}$ input pin of emulator 20 via an inverter 25, an AND gate 22, and a delay circuit 23. When the $\overline{FORCEONCE}$ pin sees a logical low signal, it causes emulator 20 to apply a logical low ONCE mode control signal to the TXD pin of microcontroller 10 via its respective TXD pin. Upon receiving the logical low ONCE mode control signal at its TXD pin and being just out of the reset state, microcontroller 10 enters the ONCE mode in which all circuitry of microcontroller 10 is tri-stated. The logical low ONCE mode control signal needs to be maintained at the TXD pin of microcontroller 10 when microcontroller 10 is leaving the reset state. This is because the TXD pin of microcontroller 10 is not a dedicated ONCE mode pin and will have to be used for other functions during the normal operation of microcontroller 10. In the prior arrangement as shown in FIG. 1, delay circuit 23 provides the logical low signal to the $\overline{FORCEONCE}$ pin of emulator 20 when microcontroller 10 is exiting the reset state (i.e., at the rising edge of the $\overline{RESET}$ signal). The delay circuit 23 provides a predetermined delay to the $\overline{RESET}$ signal applied to the $\overline{FORCEONCE}$ pin of emulator 20. In this way, the $\overline{FORCEONCE}$ pin of emulator 20 can still be applied with a logical low signal at the rising edge of the $\overline{RESET}$ signal, which causes microcontroller 10 to enter the ONCE mode.

Once disadvantage of such prior arrangement is that the prior arrangement typically cannot reliably place microcontroller 10 into the ONCE mode when the $\overline{RESET}$ signal rises relatively slowly. This is due to the fact that microcontroller 10 has a different switching threshold voltage than that of inverter 25. FIG. 2 illustrates the different switching threshold voltages of microcontroller 10 and inverter 25.

In FIG. 2, curve 35 represents the $\overline{\text{RESET}}$ signal and curve 36 represents the ONCE mode control signal applied at the TXD pin of microcontroller 10. Voltage $V_{1T}$ is the switching threshold voltage of inverter 25 and voltage $V_{2T}$ is the switching threshold voltage of microcontroller 10. When the $\overline{\text{RESET}}$ signal rises relatively slowly due to relatively large capacitance in reset circuitry 21, microcontroller 10 senses a logical high $\overline{\text{RESET}}$ signal at timing $t_2$ while inverter 25 sense a logical high $\overline{\text{RESET}}$ signal at timing $t_0$. After the predetermined delay by delay circuit 23 which ends at timing $t_1$, the logical high $\overline{\text{RESET}}$ signal sensed by inverter 25 is applied to the $\overline{\text{FORCEONCE}}$ pin of emulator 20 which then causes the ONCE mode control signal applied at the TXD pin of microcontroller 10 to go high. However, because of the relatively slow rising, timing $t_2$ at which microcontroller 10 senses the logical high comes after timing $t_1$ at which the ONCE mode control signal at the TXD pin of microcontroller 10 goes to logical high state. In this case, microcontroller 10 cannot be placed in the ONCE mode. This failure of microcontroller 10 to be placed in the ONCE mode results in signal contention between microcontroller 10 and emulator 20, which may result in damages to one or both.

SUMMARY AND OBJECTS OF THE INVENTION

One of the objects of the present invention is to provide circuitry and a method for allowing a microprocessor/microcontroller on a PCB to be on circuit emulated without physically removing the component from the PCB.

Another object of the present invention is to provide circuitry and a method for reliably placing a microprocessor/microcontroller into an ONCE mode.

Another object of the present invention is to provide circuitry and a method for reliably placing a microprocessor/microcontroller into an ONCE mode, wherein the microprocessor/microcontroller does not have a dedicated ONCE mode control input.

A further object of the present invention is to provide circuitry and a method for maintaining an asserted ONCE mode control signal on a microprocessor/microcontroller until after the microprocessor/microcontroller exits its reset state.

An emulation system for performing an on-circuit emulation operation of a component in a data processing system is described. The component includes a plurality of pins coupled to the remaining circuitry of the data processing system. An emulator is coupled to the remaining circuitry in the same manner as that the component is coupled to the remaining circuitry for issuing an on-circuit emulation control signal to one of the plurality of pins of the component to place the component in an on-circuit emulation mode and for performing the on-circuit emulation operation of the component. A reset circuit is coupled to a reset input of the component and a reset input of the emulator for generating a reset signal to reset the component and the emulator. When the reset signal is in a first voltage state, the component and the emulator are in a reset state. When the reset signal reaches a second voltage state, the component and the emulator exit the reset state. A comparator is coupled to receive the reset signal and a reference voltage for causing the emulator to generate the on-circuit emulation control signal to the one of the plurality of pins of the component when the reset signal is in the first voltage state, and for causing the emulator to maintain the on-circuit emulation control signal applied at the one of the plurality of pins of the component until after both the component and the emulator are out of the reset state such that the component can enter the on-circuit emulation mode and the emulator can start the on-circuit emulation operation after both of the component and the emulator exit the reset state. The voltage level of the reference voltage is higher than the second voltage state of the reset signal.

A method of placing a component of a data processing system in an on-circuit emulation mode for an on-circuit emulation operation is described. The component includes a plurality of pins coupled to the remaining circuitry of the data processing system. An emulator is coupled to the remaining circuitry of the data processing system in the same manner as that the component is coupled to the remaining circuitry. A reset signal is generated to a reset input of the component and a reset input of the emulator. When the reset signal is in a first voltage state, the component and the emulator are in a reset state. When the reset signal reaches a second voltage state, the component and the emulator exit the reset state. The emulator is caused to generate the on-circuit emulation control signal to one of the plurality pins of the component when the reset signal is in the first voltage state. The emulator is also caused to maintain the on-circuit emulation control signal applied at the one of the plurality of pins of the component until after both the component and the emulator are out of the reset state such that the component can enter the on-circuit emulation mode and the emulator can start the on-circuit emulation operation after both of the component and the emulator exit the reset state. The component does not include a dedicated on-circuit emulation mode enable input. The emulator performs the on-circuit emulation operation on the component when the component is in the on-circuit emulation mode.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
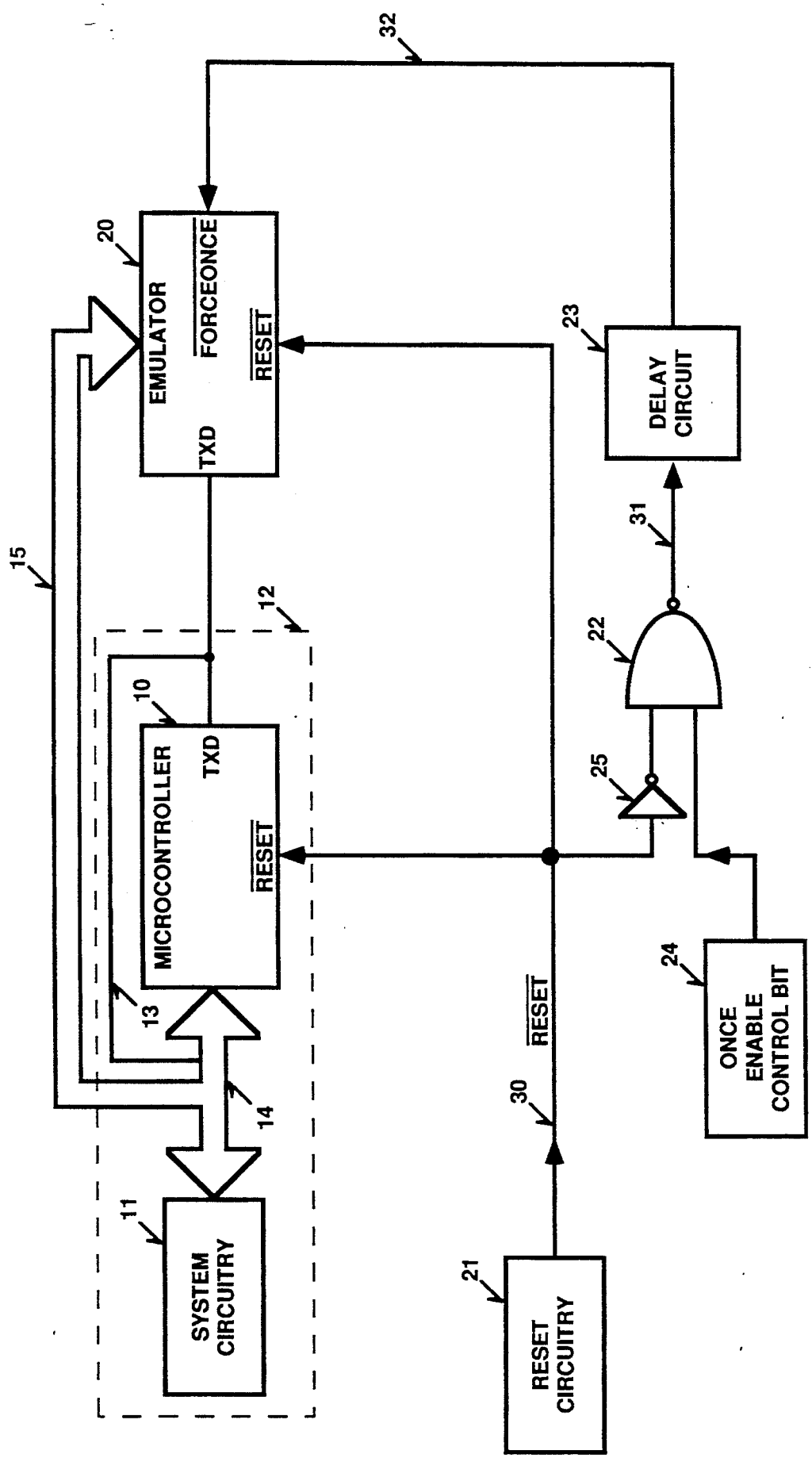
FIG. 1 is a block diagram of a prior art arrangement for placing a microcontroller in an ONCE mode.
Figure 2:
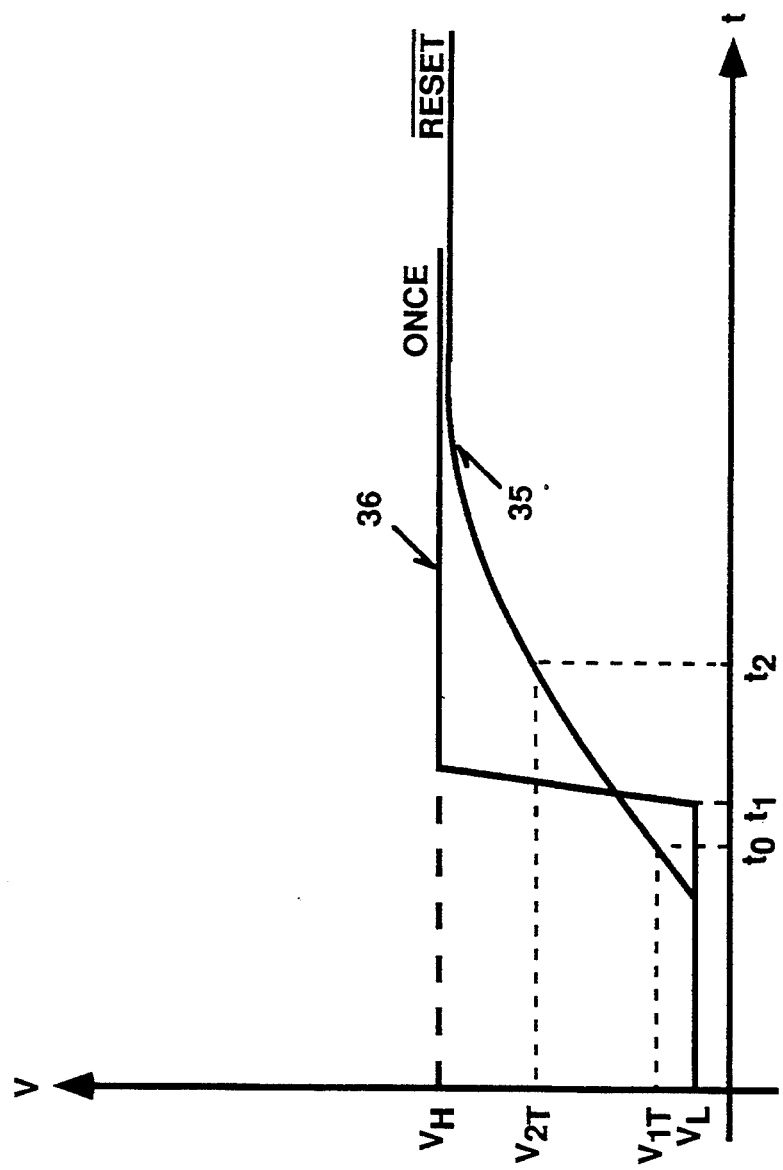
FIG. 2 is a graphic diagram illustrating the signal relationship of a reset signal $\overline{\text{RESET}}$ and an ONCE mode control signal ONCE generated by the prior art arrangement of FIG. 1.
Figure 3:
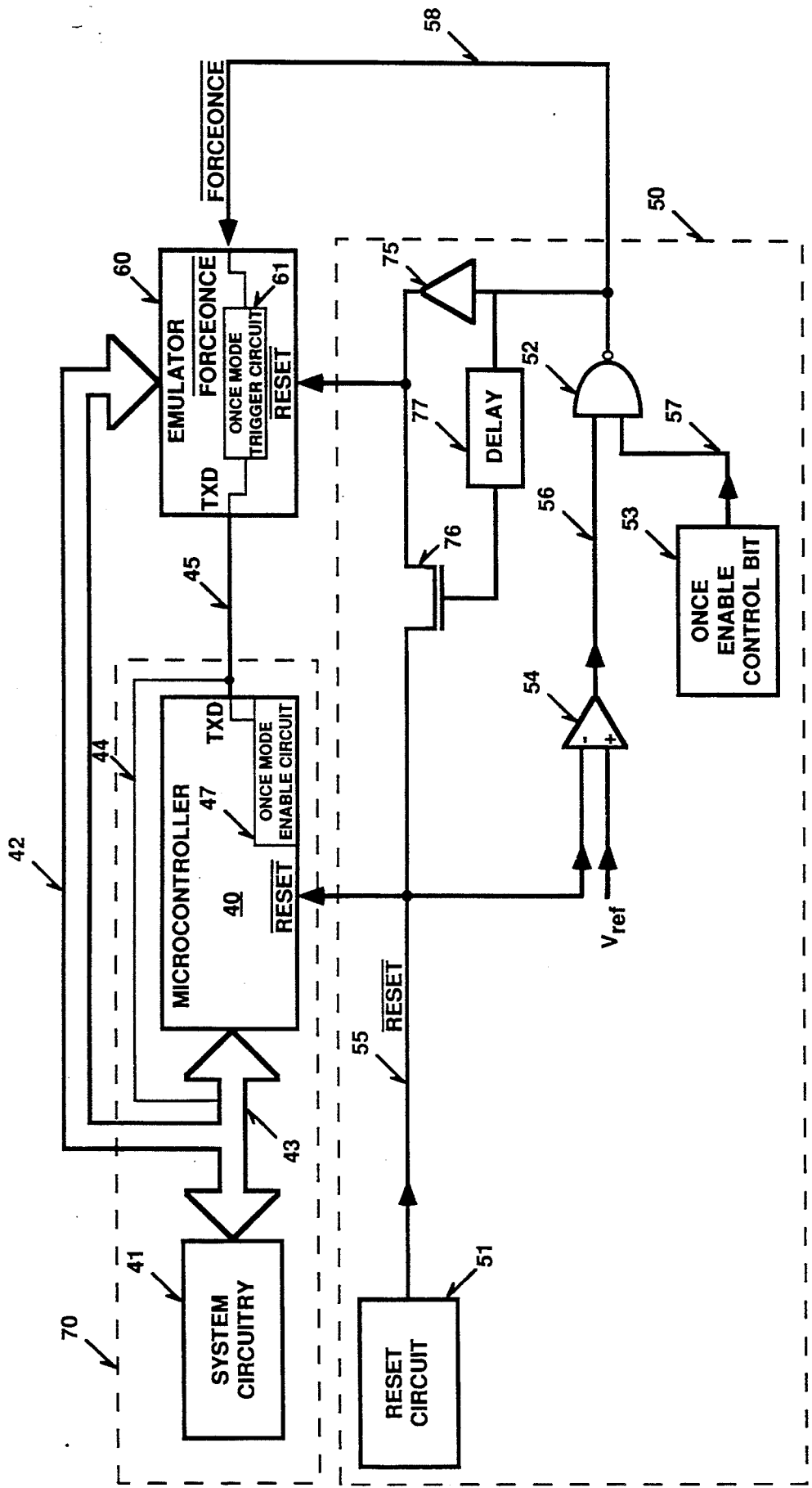
FIG. 3 is a block diagram of an arrangement for placing a microcontroller in an ONCE mode, according to a preferred embodiment of the present invention.

FIG. 3 illustrates in block diagram form an arrangement of reliably placing a microcontroller 40 in an ONCE mode for an ONCE operation of microcontroller 40, which implements a preferred embodiment of the present invention.

As will be described in detail below, microcontroller 40 includes a plurality of pins coupled in a system to circuitry external to microcontroller 40. Microcontroller 40 is also equipped with an ONCE mode in which all circuitry of microcontroller 40 is electrically disconnected with the external circuitry. An emulator is coupled to the external circuitry in the same manner as microcontroller 40 is coupled to the external circuitry (i.e., in piggyback style) for performing an on-circuit emulation operation of microcontroller 40. The emulator places the microcontroller in the ONCE mode for the on-circuit emulation operation by generating an ONCE mode control signal to one of the plurality of pins of the microcontroller. A reset circuit is coupled to a reset input of the microcontroller and a reset input of the emulator for generating a reset signal to reset the microcontroller and the emulator. When the reset signal is in a logical low voltage state, the microcontroller and the emulator are in the reset state. When the reset signal reaches a logical high voltage state, the microcontroller and the emulator exit the reset state. A comparator is coupled to receive the reset signal and a reference voltage for causing the emulator to generate the ONCE mode control signal to that pin of the microcontroller when the reset signal is in the logical low voltage state, and for causing the emulator to maintain the ONCE mode control signal applied at that pin of the microcontroller until after both the microcontroller and the emulator exit the reset state such that the microcontroller is ensured to enter the ONCE mode after exiting the reset state. The voltage level of the reference voltage is higher than the logical high voltage state of the reset signal. When the reset signal reaches the voltage level of the reference voltage, comparator causes the emulator to deassert the ONCE mode control signal at the microcontroller.

Referring to FIG. 3, microcontroller 40 is coupled to a system circuitry 41 via lines 43. Microcontroller 40 and system circuitry 41 form a user system 70. User system 70 can be any customer designed data processing system that employs microcontroller 40.

In one embodiment, microcontroller 40 comprises an 80C196KC microcontroller manufactured by Intel Corporation of Santa Clara, Calif. In alternative embodiments, microcontroller 40 may comprise other types of microcontrollers. For example, microcontroller 40 may comprise an 80C196KB microcontroller or an 87C196KB microcontroller, both manufactured by Intel Corporation.

Alternatively, microcontroller 40 may be a microprocessor. In one embodiment, microcontroller is an 80386 microprocessor (i.e., i386 TM CPU) manufactured by Intel Corporation.

In another embodiment, microcontroller 40 is an 80486 microprocessor (i.e., i486 TM CPU) also manufactured by Intel Corporation.

During the normal operation, microcontroller 40 interacts with system circuitry 41 to deliver its specified control functions in user system 70.

Microcontroller 40 includes a plurality of pins (not all are shown) that are coupled to system circuit 41 via lines 43 and 44. Each of the plurality of pins is used to provide one or more input and/or output functions for microcontroller 40. When a pin is equipped to provide more than one input or output function, it is referred to as a multi-function pin. In a preferred embodiment, microcontroller 40 includes a number of multi-function pins.

As described above, microcontroller 40 is equipped with the ONCE mode. When microcontroller 40 is in the ONCE mode, all circuitry within microcontroller 40 is tri-stated and therefore, is electrically disconnected with system circuitry 41. Being in the ONCE mode, microcontroller 40 can be on-circuit emulated by a dedicated emulator 60. Emulator 60 emulates the operation of microcontroller 40 in a bondout fashion during the ONCE operation. When microcontroller 40 comprises the 80C196KC microcontroller or 80C196KB microcontroller, emulator 60 can be an ICE TM -196KB/PC emulator. When microcontroller 40 comprises the 80C196KB or the 87C196KB microcontroller, emulator 60 can be an ICE TM -196KB/HX emulator. When microcontroller 40 comprises an i386 TM microprocessor, emulator 60 can be an ICE TM -386 emulator (e.g., ICE TM -386SX emulator or ICE TM -386SL emulator). When microcontroller 40 comprises an i486 TM microprocessor, emulator 60 can be an ICE TM -486 emulator.

Because emulator 60 emulates the operation and function of microcontroller 40 during the ONCE operation, it includes all the pins that microcontroller 40 has. In other words, each of the plurality pins of microcontroller 40 is mirrored to emulator 60. During the ONCE operation of microcontroller 40, these mirrored pins of emulator 60 are coupled to system circuitry 41 via lines 42–45.

Emulator 60 is coupled to system circuitry 41 in the same manner as microcontroller 40 is connected to during the ONCE operation. This is done by having each of the mirrored pins of emulator 60 piggyback connected to its corresponding one of the plurality pins of microcontroller 40. Because microcontroller 40 is placed in the ONCE mode in which all circuitry of the microcontroller is electrically disconnected with external circuitry during the ONCE operation, emulator 60 is thus exclusively connected to system circuitry 41 via lines 42–45 in the same manner as microcontroller 40 has been connected to before entering the ONCE mode. Emulator 60 then performs the emulation operation (i.e., ONCE operation) of microcontroller 40.

To enter the ONCE mode, microcontroller 40 includes an ONCE mode enable circuit 47. When enabled, ONCE mode enable circuit 47 tri-states all circuitry of microcontroller 40. This therefore places microcontroller 40 in the ONCE mode.

ONCE mode enable circuit 47 of microcontroller 40 is enabled when receiving a logical low ONCE mode control signal via one of the plurality of pins. In one embodiment, ONCE mode enable circuit 47 of microcontroller 40 receives the logical low ONCE mode control signal via an output pin. In an alternative embodiment, ONCE mode enable circuit 47 of microcontroller 40 receives the ONCE mode control signal via a dedicated ONCE mode pin.

The pin that receives the ONCE mode control signal is connected to ONCE mode enable circuit 47, and couples the signal to ONCE mode enable circuit 47. Under the control of the ONCE mode control signal, ONCE mode enable circuit 47 causes all the circuitry of microcontroller 40 to be tri-stated, thus entering the ONCE mode.

As shown in FIG. 3, microcontroller 40 includes a TXD pin, which is one of the plurality of pins of the microcontroller. The TXD pin is used as an output pin to transmit data out of microcontroller 40 during the normal operation of the component. As shown in FIG.

3, the TXD pin is connected to system circuitry 41 via lines 43 and 44. During the normal operation, the TXD pin transmits data from microcontroller 40 to system circuitry 41 via lines 43 and 44.

In the currently preferred embodiment, the TXD pin is also used to receive the logical low ONCE mode control signal to cause microcontroller 40 to enter the ONCE mode. Therefore, the TXD pin is a multifunction pin. The TXD pin is connected to ONCE mode enable circuit 47 inside microcontroller 40 and applies the logical low ONCE mode control signal to the ONCE mode enable circuit.

Microcontroller 40 also includes a $\overline{\text{RESET}}$ pin. The $\overline{\text{RESET}}$ pin receives an active low reset signal $\overline{\text{RESET}}$ to reset the microcontroller. When the logical low reset signal $\overline{\text{RESET}}$ is applied at the $\overline{\text{RESET}}$ pin, microcontroller 40 enters the reset state in which all resettable circuitry of microcontroller 40 is reset. In addition, emulator 60 includes a $\overline{\text{RESET}}$ pin that also receives a logical low reset signal $\overline{\text{RESET}}$ to reset emulator 60. When the reset signal $\overline{\text{RESET}}$ is applied at the $\overline{\text{RESET}}$ pin, emulator 60 enters the reset state in which all resettable circuitry of emulator 60 is reset.

Because the TXD pin of microcontroller 40 is used as an output pin to transmit data out of the microcontroller during the normal operation, the TXD pin therefore cannot receive any input signal during the normal operation of microcontroller 40. The ONCE mode control signal can thus only be applied to microcontroller 40 when the device is in the reset state. In this case, microcontroller 40 can only enter the ONCE mode when the TXD pin is maintained logical low at the rising edge of the reset signal $\overline{\text{RESET}}$ applied at the $\overline{\text{RESET}}$ pin (i.e., when microcontroller 40 is exiting the reset state). After microcontroller 40 is placed in the ONCE mode, the logical low ONCE mode control signal at the TXD pin of the microcontroller can be deasserted (i.e., logically high). Microcontroller 40 can leave the ONCE mode by entering the reset state again. When exiting the reset state without the logical low ONCE mode control signal at the TXD pin, microcontroller 40 returns to the normal operational mode. Therefore, microcontroller 40 enters or leaves the ONCE mode whenever it leaves the reset state.

In an alternative embodiment, any one of other output pins of microcontroller 40 can be used to trigger the ONCE mode. In this case, that particular output pin, like the TXD pin, is connected to ONCE mode enable circuit 47 and receives the ONCE mode control signal when microcontroller 40 is in the reset state. The ONCE mode control signal then causes ONCE mode enable circuit 47 to place microcontroller 40 in the ONCE mode when microcontroller 40 is leaving the reset state. In a further alternative embodiment, microcontroller 40 includes a dedicated ONCE mode pin which couples the ONCE mode control signal to the ONCE mode enable circuit it connects. In this case, microcontroller 40 enters the ONCE mode by placing the logical low ONCE mode control signal at the dedicated ONCE mode pin at any time without requiring microcontroller 40 to go into the reset state first.

Emulator 60 also includes a TXD pin, as can be seen from FIG. 3 and from above described. The TXD pin of emulator 60, like its counterpart in microcontroller 40, transmits data out of emulator 60 during the emulation operation. The TXD pin of emulator 60 also generates the ONCE mode control signal to the TXD pin of microcontroller 40 via line 45 to place microcontroller 40 in the ONCE mode for the ONCE operation. After microcontroller 40 enters the ONCE mode, the TXD pin deasserts the ONCE mode control signal and is then used to transmit data to system circuitry 41.

Emulator 60 also includes a $\overline{\text{FORCEONCE}}$ pin and an ONCE mode trigger circuit 61. ONCE mode trigger circuit 61 is connected to the $\overline{\text{FORCEONCE}}$ pin and the TXD pin of emulator 60. ONCE mode trigger circuit 61 generates the ONCE mode control signal to the TXD pin of emulator 60. The TXD pin of emulator 60 then applies the signal to the TXD pin of microcontroller 40. ONCE mode trigger circuit 61 is controlled by a logical low $\overline{\text{FORCEONCE}}$ signal received from the $\overline{\text{FORCEONCE}}$ pin of emulator 60. Whenever the $\overline{\text{FORCEONCE}}$ pin of emulator 60 receives a logical low signal, ONCE mode trigger circuit 61 is triggered to generate the logical low ONCE mode control signal to the TXD pin of microcontroller 40 via line 45 and via the TXD pin of emulator 60.

In order to trigger ONCE mode trigger circuit 61 to generate the ONCE mode control signal and eventually to place microcontroller 40 in the ONCE mode, a control circuit 50 is provided which is external to both microcontroller 40 and emulator 60. Control circuit 50 includes a reset circuit 51 that generates the reset signal $\overline{\text{RESET}}$ to the $\overline{\text{RESET}}$ pins of microcontroller 40 and emulator 60 via line 55 and via an FET switching transistor 76. In one embodiment, reset circuit 51 is a user reset circuit within system circuitry 41. In another embodiment, reset circuit 51 is a separate reset circuit.

In one embodiment, FET switching transistor 76 is an N-channel transistor. In another embodiment, FET switching transistor 76 can be a P-channel transistor.

As can be seen from FIG. 3, reset circuit 51 supplies the reset signal $\overline{\text{RESET}}$ to both microcontroller 40 and emulator 60 at the same time. Thus, both microcontroller 40 and emulator 60 enter the reset state at substantially the same time. They also leave the reset state at substantially the same time. In the reset state, all resettable circuitry within microcontroller 40 is reset and the TXD pin of microcontroller 40 does not function to output any data. At this time, the TXD pin can receive the ONCE mode control signal from ONCE mode trigger circuit 61 via the TXD pin of emulator 60 and line 45. However, because microcontroller 40 is in the reset state, ONCE mode enable circuit 47 cannot be enabled even if the ONCE mode control signal is applied at the TXD pin of microcontroller 40.

In the reset state, all resettable circuitry within emulator 60 is reset and the TXD pin of emulator 60 does not function to transmit any data. In the reset state, however, ONCE mode trigger circuit 61 is not reset by the $\overline{\text{RESET}}$ signal and is only controlled by the $\overline{\text{FORCEONCE}}$ signal applied at the $\overline{\text{FORCEONCE}}$ pin of emulator 60. Therefore, the TXD pin of emulator 60 can supply the ONCE mode control signal generated by ONCE mode trigger circuit 61 to the TXD pin of microcontrolled 40 in the reset state.

In order to provide the logical low ONCE mode control signal at the TXD pin of microcontroller 40 when microcontroller 40 is leaving the reset state, control circuit 50 includes a comparator 54. Comparator 54 receives the reset signal and compares the voltage level of the reset signal with the voltage level of a reference voltage $V_{ref}$. When the voltage level of the reset signal $\overline{\text{RESET}}$ is below the $V_{ref}$ voltage, comparator 54 outputs a logical high signal. When the voltage level of the reset signal $\overline{\text{RESET}}$ goes above the $V_{ref}$ voltage, comparator 54 outputs a logical low signal. The output of comparator 54 is then applied to a NAND gate 52.

In one embodiment, the $V_{ref}$ voltage is approximately 2.5 volts. In alternative embodiments, the $V_{ref}$ voltage can be higher or lower than 2.5 volts. For example, the $V_{ref}$ voltage can be 2 volts or 3 volts. However, it shall be noted that the $V_{ref}$ voltage must be higher than the switching threshold voltage at which microcontroller 40 starts to exit the reset state.

NAND gate 52 also receives an ONCE enable signal from an ONCE enable control bit 53 line 57. The output of comparator 54 is NANDed with the ONCE enable signal in NAND gate 52. The output of NAND gate 52 is then applied to the $\overline{FORCEONCE}$ pin of emulator 60 via line 58 as the $\overline{FORCEONCE}$ signal to emulator 60.

As described above, when the $\overline{FORCEONCE}$ signal is asserted (i.e., logic low), ONCE mode trigger circuit 61 of emulator 60 generates the ONCE mode control signal to the TXD pin of microcontroller 60. When the $\overline{FORCEONCE}$ signal is not asserted (i.e., logic high), ONCE mode trigger circuit 61 does not generate the ONCE mode control signal.

ONCE enable control bit 53 stores a bit of information that identifies whether emulator 60 is performing the ONCE operation or an in-circuit emulation (i.e., ICE) operation. When emulator 60 is performing the ICE operation, it is not required that the ONCE mode control signal be generated. This is due to the fact that microcontroller 40 will have to be physically removed for the ICE operation. When the bit information stored in ONCE enable control bit 53 is logical zero, for example, it indicates that emulator 60 will not operate in the ONCE mode. In this case, control bit 53 outputs a logical low signal to NAND gate 52 via line 57 which blocks NAND gate 52 from asserting the $\overline{FORCEONCE}$ signal to emulator 60.

When the bit information stored in ONCE enable control bit 53 is logical one, for example, it indicates that emulator 60 will operate in the ONCE mode. In this case, control bit 53 outputs a logical high signal to NAND gate 52 via line 57, allowing NAND gate 52 to output the $\overline{FORCEONCE}$ signal according to the output of comparator 54.

In one embodiment, ONCE enable control bit 53 is a latch or a register that stores one bit of data. In this case, the bit information stored in control bit 53 can be updated at user's desire. In alternative embodiments, other means can be provided for control bit 53. For example, control bit 53 can be a memory cell.

The output of NAND gate 52 is also coupled to a buffer 75 and to the gate of FET transistor 76 via a delay circuit 77. In one embodiment, buffer 75 is an open collector buffer. The function of FET transistor 76, buffer 75, and delay circuit 77 is to prevent emulator 60 to come out of the reset state while the $\overline{FORCEONCE}$ signal from NAND gate 52 is still being asserted. If that happened, emulator 60 could begin executing codes and potentially attempt to control its TXD pin at the same time that ONCE mode trigger circuit 61 is driving the TXD pin.

The operation of reliably placing microcontroller 40 in the ONCE mode for the ONCE operation will be described in more detail below.

During the normal operation, microcontroller 40 performs its function and interacts with system circuitry 41. Emulator 60 is not connected with microcontroller 40 and system circuitry 41. When the ONCE operation is to be performed for microcontroller 40, microcontroller 40 is not removed from system 70 and emulator 60 is connected to system 70 with each of its mirrored pins piggyback connected to its counterpart of microcontroller 40, as described above. In this case, for example, the TXD pin of emulator 60 is connected to the TXD pin of microcontroller 40 via line 45 and to system circuitry 41 via lines 43-45, as shown in FIG. 3.

Reset circuit 51 then generates the reset signal $\overline{RESET}$ to the $\overline{RESET}$ pin of microcontroller 40 via line 55 to place the device in the reset state. Because FET transistor 76 is initially turned on, the reset signal $\overline{RESET}$ is also coupled to the $\overline{RESET}$ pin of emulator 60 via FET transistor 76. The logical low $\overline{RESET}$ signal also causes comparator 54 to output a logical high signal to NAND gate 52. Because emulator 60 is to perform the ONCE operation, the bit information in control bit 53 releases NAND gate 52. NAND gate 52 then applies the logical low $\overline{FORCEONCE}$ signal to the $\overline{FORCEONCE}$ pin of emulator 60, which causes ONCE mode trigger circuit 61 to apply the logical low ONCE mode control signal to the TXD pin of microcontroller 40. In addition, the logical low signal from NAND gate 52 is also applied to buffer 75 and delay circuit 77. After a short delay by delay circuit 77, the logical low signal is coupled to the gate of FET transistor 76 and turns it off. At this time, buffer 75 supplies the logical low $\overline{RESET}$ signal to emulator 60.

Reset circuit 51 then raises the voltage level of the $\overline{RESET}$ signal applied at the $\overline{RESET}$ pins of microcontroller 40 and emulator 60 to allow them exit the reset state. When the voltage level of the $\overline{RESET}$ signal rises to the switching threshold voltage, microcontroller 40 detects a logical high $\overline{RESET}$ signal and starts to exit the reset state. At this time, however, because the reference voltage $V_{ref}$ is set to be always higher than the switching threshold voltage, the output of comparator 54 remains logical high. This causes NAND gate 52 to maintain the logical low reset signal $\overline{RESET}$ on the $\overline{RESET}$ pin of emulator 60 via buffer 75 and to keep the logical low $\overline{FORCEONCE}$ signal to the $\overline{FORCEONCE}$ pin of emulator 60, which results in emulator 60 remaining in the reset state and the logical low ONCE mode control signal maintained on the TXD pin of microcontroller 40. The logical low ONCE mode control signal then causes microcontroller 40 to enter the ONCE mode.

The logical low reset signal $\overline{RESET}$ remains asserted at the $\overline{RESET}$ pin of emulator 60 and the logical low ONCE mode control signal remains asserted at the TXD pin of microcontroller 40 until the voltage level of the $\overline{RESET}$ signal rises to the $V_{ref}$ voltage. At this time, comparator 54 outputs a logical low signal to NAND gate 52. NAND gate 52 then deasserts the $\overline{FORCEONCE}$ signal, which in turn deasserts the $\overline{ONCE}$ mode control signal at the TXD pin of microcontroller 40. In addition, NAND gate 52 also provides a logical high reset signal to the $\overline{RESET}$ pin of emulator 60, which causes emulator 60 to leave the reset state. At this point, FET transistor 76 is still turned off, closing the open feedback loop between the reset pins of microcontroller 40 and emulator 60. After a short delay by delay circuit 97, the logical high signal from NAND gate 52 is coupled to the gate of FET transistor 76, turning it back on. The short delay provides enough time for emulator 60 to exit the reset state. Emulator 60 is now ready to execute codes, and is now in the ONCE mode.

By having comparator 54 and the reference voltage $V_{ref}$ to assert and deassert the ONCE mode control signal at the TXD pin of microcontroller 40, microcontroller 40 can be reliably placed in the ONCE mode when it is exiting the reset state. This is due to the fact that the deassertion of the ONCE mode control signal at the TXD pin can only be made after microcontroller 40 is out of the reset state, regardless of the rising time of the $\overline{RESET}$ signal. No matter how slow or how fast the $\overline{RESET}$ signal rises, comparator 54 switches its output only when the voltage level of the $\overline{RESET}$ signal is above the $V_{ref}$ voltage. As long as the $V_{ref}$ voltage is higher than the switching threshold voltage, it is assured that microcontroller 40 will enter the ONCE mode.

By having FET transistor 76, buffer 75, and delay circuit 77, emulator 60 is ensured to leave the reset state after microcontroller 40 is placed in the ONCE mode. Without these elements, a slow rising reset signal $\overline{RESET}$ from reset circuit 51 may cause emulator 60 to leave the reset state while the $\overline{FORCEONCE}$ signal from NAND gate 52 is still being asserted. In this situation, emulator 60 could begin executing codes an potentially attempt to control the TXD pin at the same time the $\overline{FORCEONCE}$ is driving the TXD pin.

Alternatively, control circuit 50 does not include these elements 75–77. In this case, FET transistor 76 is replaced with a straight line.

Figure 4:
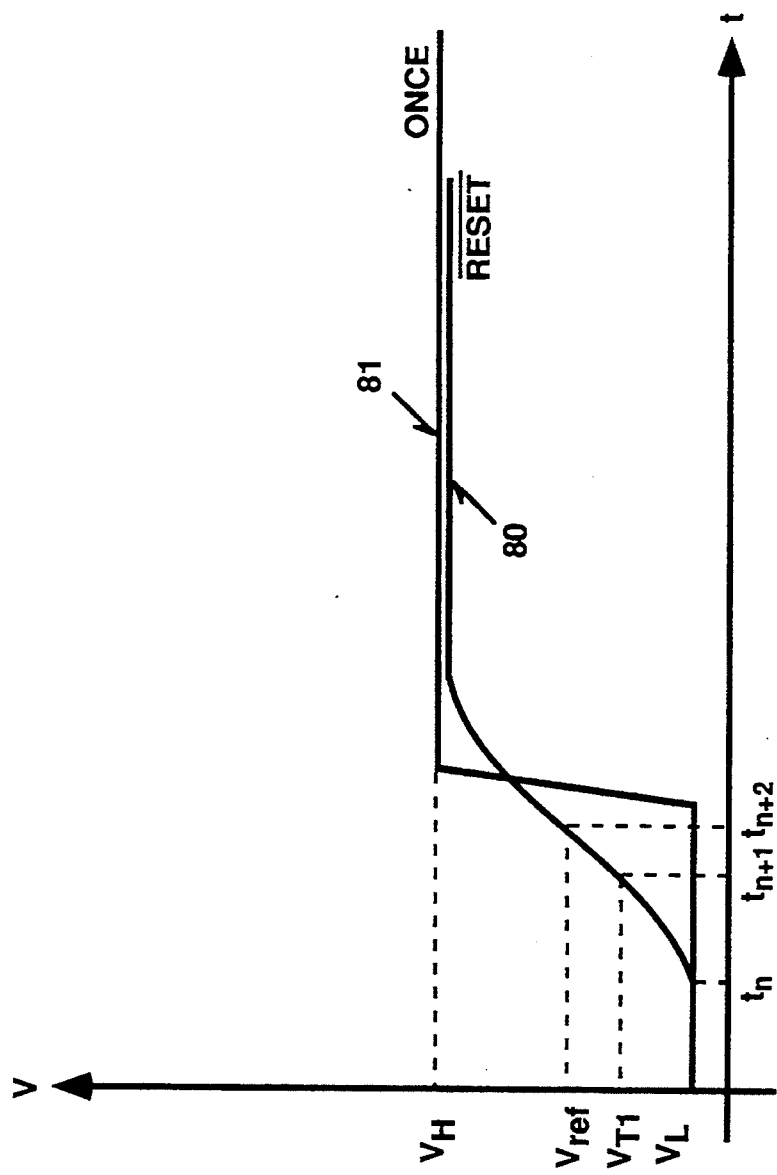
FIG. 4 is a graphic diagram illustrating the signal relationship of a reset signal $\overline{\text{RESET}}$ and an ONCE mode control signal ONCE generated by the arrangement of FIG. 3.

FIG. 4 illustrates the signal waveforms of the $\overline{RESET}$ signal and the ONCE mode control signal applied at the TXD pin of microcontroller 40. In FIG. 4, curve 80 represents the $\overline{RESET}$ signal applied at the $\overline{RESET}$ pin of microcontroller 40 and curve 81 represents the ONCE mode control signal applied at the TXD pin of microcontroller 40. Voltage $V_{T1}$ is the switching threshold voltage of microcontroller 40 at which microcontroller 40 begins to exit the reset state. Voltage $V_{ref}$ is the voltage at which the ONCE mode control signal applied to the TXD pin of microcontroller 40 is deasserted (i.e., logically high). It therefore can be seen from FIG. 4 that as long as the voltage level of the $V_{T1}$ voltage is lower than the voltage level of the $V_{ref}$ voltage, microcontroller 40 always exits the reset state with the logical low ONCE mode control signal applied at its TXD pin.

As shown in FIG. 4, the $\overline{RESET}$ signal is initially at logical low voltage state. At this time, microcontroller 40 is in the reset state. At timing $t_n$, the $\overline{RESET}$ signal starts to rise. At timing $t_{n+1}$, the $\overline{RESET}$ signal reaches the $V_{T1}$ voltage at which microcontroller 40 starts to leave the reset state. However, because voltage level of the $V_{T1}$ voltage is lower than the voltage level of the $V_{ref}$ voltage, the output of comparator 54 (FIG. 3) remains at logical low level, which results in the logical low ONCE mode control signal (curve 81) remaining asserted at the TXD pin of microcontroller 40. This therefore causes microcontroller 40 to enter the ONCE mode. At timing $t_{n+2}$, the voltage level of the $\overline{RESET}$ signal reaches the $V_{ref}$ voltage. At this time, comparator 54 of FIG. 3 outputs a logical high signal to the $\overline{FORCEONCE}$ pin of emulator 60 which causes the logical low ONCE mode control signal (curve 81) to be deasserted (i.e., logically high), releasing the TXD pin of emulator 60 for the intended data transfer function during the emulation operation. Also at this time, emulator 60 is out of the reset state.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An emulation system for performing an on-circuit emulation operation of a component in a data processing system, wherein the component includes a plurality of pins coupled to the remaining circuitry of the data processing system, wherein the emulation system comprises:

(A) emulation means coupled to the remaining circuitry in the same manner as that the component is coupled to the remaining circuitry for issuing an on-circuit emulation control signal to one of the plurality of pins of the component to place the component in an on-circuit emulation mode and for performing the on-circuit emulation operation of the component;

(B) reset means coupled to a reset input of the component and a reset input of the emulation means for generating a reset signal to reset the component and the emulation means, wherein when the reset signal is in a first voltage state, the component and the emulation means are in a reset state, wherein when the reset signal reaches a second voltage state, the component and the emulation means exit the reset state;

(C) comparator means coupled to receive the reset signal and a reference voltage for causing the emulation means to generate the on-circuit emulation control signal to the one of the plurality of pins of the component when the reset signal is in the first voltage state, and for causing the emulation means to maintain the on-circuit emulation control signal applied at the one of the plurality of pins of the component until after both the component and the emulation means are out of the reset state such that the component can enter the on-circuit emulation mode and the emulation means can start the on-circuit emulation operation after both of the component and the emulation means exit the reset state, wherein the voltage level of the reference voltage is higher than the second voltage state of the reset signal.

2. The on-circuit emulation system of claim 1, wherein the plurality of pins of the component are electrically disconnected with the remaining circuitry of the data processing system while physically coupled to the remaining circuitry of the data processing system in the on-circuit emulation mode.

3. The on-circuit emulation system of claim 1, wherein the comparator means comprises a comparator.

4. The on-circuit emulation system of claim 1, wherein the comparator means causes the emulation means to stop applying the on-circuit emulation control signal to the one of the plurality of pins of the component when the voltage level of the reset signal reaches the voltage level of the reference voltage.

5. The on-circuit emulation system of claim 1, wherein the first voltage state is a logical low voltage and the second voltage state is a logical high voltage, wherein the reference voltage is approximately 2.5 volts.

6. The on-circuit emulation system of claim 1, wherein the one of the plurality of pins of the component is not a dedicated pin for the on-circuit emulation control signal.

7. The on-circuit emulation system of claim 1, wherein the component is a microcontroller.

8. The on-circuit emulation system of claim 1, wherein the component is a microprocessor.

9. The on-circuit emulation system of claim 1, further comprising means coupled between the reset means and the reset input of the emulation means and to the comparator means for assuring the emulation means to remain in the reset state while the on-circuit emulation control signal is applied at one of the plurality of pins of the component, wherein the assuring means comprises an FET transistor coupled between the reset means and the reset input of the emulation means, a buffer means coupled between the comparator means and the reset input of the emulation means, and a delay means coupled between the comparator and a gate of the FET transistor.

10. In an emulation system having an emulation means for performing an on-circuit emulation operation of a component of a data processing system, wherein the component includes a plurality of pins coupled to the remaining circuitry of the data processing system, wherein the emulation means is coupled to the remaining circuitry in the same manner as that the component is coupled to the remaining circuitry, wherein the plurality pins of the component are electrically disconnected with the remaining circuitry when the component is placed in an on-circuit emulation mode during the on-circuit emulation operation, a control circuitry for placing the component in the on-circuit emulation mode, comprising:

(A) reset means coupled to a reset input of the component and a reset input of the emulation means for generating a reset signal to reset the component and the emulation means, wherein when the reset signal is in a first voltage state, the component and the emulation means are in a reset state, wherein when the reset signal reaches a second voltage state, the component and the emulation means exit the reset state; and (B) comparator means coupled to receive the reset signal and a reference voltage for causing the emulation means to generate an on-circuit emulation control signal to one of the plurality of pins of the component to place the component in the on-circuit emulation mode when the reset signal is in the first voltage state, and for causing the emulation means to maintain the on-circuit emulation control signal applied at the one of the plurality of the component until after both the component and the emulation means are out of the reset state such that the component can enter the on-circuit emulation mode and the emulation means can start the on-circuit emulation operation after both of the component and the emulation means exit the reset state, wherein the voltage level of the reference voltage is higher than the second voltage state of the reset signal.

11. The on-circuit emulation system of claim 10, wherein the comparator means comprises a comparator.

12. The on-circuit emulation system of claim 10, wherein the comparator means causes the emulation means to stop applying the on-circuit emulation control signal to the one of the plurality of pins of the component when the voltage level of the reset signal reaches the voltage level of the reference voltage.

13. The on-circuit emulation system of claim 10, wherein the first voltage state is a logical low voltage and the second voltage state is a logical high voltage, wherein the reference voltage is approximately 2.5 volts.

14. The on-circuit emulation system of claim 10, wherein the one of the plurality of pins of the component is not a dedicated pin for the on-circuit emulation control signal.

15. The on-circuit emulation system of claim 10, wherein the component is a microcontroller.

16. The on-circuit emulation system of claim 10, wherein the component is a microprocessor.

17. The on-circuit emulation system of claim 10, further comprising means coupled between the reset means and the reset input of the emulation means and to the comparator means for assuring the emulation means to remain in the reset state while the on-circuit emulation control signal is applied at one of the plurality of pins of the component, wherein the assuring means comprises an FET transistor coupled between the reset means and the reset input of the emulation means, a buffer means coupled between the comparator means and the reset input of the emulation means, and a delay means coupled between the comparator and a gate of the FET transistor.

18. A method of placing a component of a data processing system in an on-circuit emulation mode for an on-circuit emulation operation, wherein the component includes a plurality of pins coupled to the remaining circuitry of the data processing system, wherein the method comprises the steps of:

(a) coupling an emulation means to the remaining circuitry of the data processing system in the same manner as that the component is coupled to the remaining circuitry;

(b) generating a reset signal to a reset input of the component and a reset input of the emulation means, wherein when the reset signal is in a first voltage state, the component and the emulation means are in a reset state, wherein when the reset signal reaches a second voltage state, the component and the emulation means exit the reset state;

(c) causing the emulation means to generate the on-circuit emulation control signal to one of the plurality pins of the component when the reset signal is in the first voltage state, and causing the emulation means to maintain the on-circuit emulation control signal applied at the one of the plurality of pins of the component until after both the component and the emulation means are out of the reset state such that the component can enter the on-circuit emulation mode and the emulation means can start the on-circuit emulation operation after both of the component and the emulation means exit the reset state, wherein the component does not include a dedicated on-circuit emulation mode enable input, wherein the emulation means performs the on-circuit emulation operation on the component when the component is in the on-circuit emulation mode.

19. The method of placing the component in the on-circuit emulation mode of claim 18, wherein the step (c) further comprises the step of providing a comparator means for comparing the voltage level of the reset signal with the voltage level of a reference voltage, wherein the comparator means causes the emulation means to stop applying the on-circuit emulation control signal to the one of the plurality of pins of the component when the voltage level of the reset signal reaches the voltage level of the reference voltage, wherein the voltage level of the reference voltage is higher than the second voltage state of the reset signal.

20. The method of placing the component in the on-circuit emulation mode of claim 19, wherein the first voltage state is a logical low voltage and the second voltage state is a logical high voltage, wherein the reference voltage is approximately 2.5 volts.

21. The method of placing the component in the on-circuit emulation mode of claim 19, wherein the component is a microcontroller.

22. The method of placing the component in the on-circuit emulation mode of claim 19, wherein the component is a microprocessor.

* * * * *

UNITED STATES PATENT AND TRADEMARK OFFICE
CERTIFICATE OF CORRECTION

PATENT NO. : 5,333,307
DATED : Jul. 26, 1994
INVENTOR(S) : Gary G. Shirk, et al

It is certified that error appears in the above-indentified patent and that said Letters Patent is hereby corrected as shown below:

Column 9; Line 11; Insert--via--following "53"

Signed and Sealed this

Nineteenth Day of September, 199!

Attest:

BRUCE LEHMAN

*Attesting Officer*    *Commissioner of Patents and Trademarks*